US008391212B2

(12) United States Patent
Gao

(10) Patent No.: US 8,391,212 B2
(45) Date of Patent: Mar. 5, 2013

(54) SYSTEM AND METHOD FOR FREQUENCY DOMAIN AUDIO POST-PROCESSING BASED ON PERCEPTUAL MASKING

(75) Inventor: Yang Gao, Mission Viejo, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 12/773,638

(22) Filed: May 4, 2010

(65) Prior Publication Data

US 2011/0002266 A1 Jan. 6, 2011

Related U.S. Application Data

(60) Provisional application No. 61/175,573, filed on May 5, 2009.

(51) Int. Cl.
*H04W 4/00* (2009.01)

(52) U.S. Cl. ........ 370/328; 370/343; 370/210; 704/500; 704/200.1; 704/207; 704/223

(58) Field of Classification Search .................. 370/328, 370/338; 704/500, 200.1, 226, 501, 230, 704/233; 381/93, 94.2
See application file for complete search history.

(56) References Cited

U.S. PATENT DOCUMENTS

| | | | | |
|---|---|---|---|---|
| 6,950,794 | B1 * | 9/2005 | Subramaniam et al. | 704/200.1 |
| 7,333,930 | B2 * | 2/2008 | Baumgarte | 704/200.1 |
| 7,430,506 | B2 * | 9/2008 | Nam et al. | 704/207 |
| 7,590,523 | B2 | 9/2009 | Gao | |
| 2004/0258255 | A1 * | 12/2004 | Zhang et al. | 381/92 |
| 2006/0262147 | A1 * | 11/2006 | Kimpe et al. | 345/690 |
| 2007/0094015 | A1 * | 4/2007 | Samake | 704/212 |
| 2007/0219785 | A1 * | 9/2007 | Gao | 704/200.1 |
| 2007/0223716 | A1 * | 9/2007 | Shirakawa et al. | 381/73.1 |
| 2008/0052067 | A1 | 2/2008 | Morito | |

FOREIGN PATENT DOCUMENTS

| | | |
|---|---|---|
| CN | 1684143 | 10/2005 |
| CN | 10134878 | 9/2007 |
| CN | 101131819 | 2/2008 |
| CN | 101140758 | 3/2008 |
| CN | 101169934 | 4/2008 |
| TW | 1272688 | 2/2007 |

OTHER PUBLICATIONS

"Masking and Perceptual Coding," Audio and the Internet, www.minidisc.org/MaskingPaper.html, Apr. 28, 2010, 5 pages.

"G.729-based embedded variable bit-rate coder: An 8-32 kbit/s scalable wideband coder bitstream interoperable with G.729," Series G: Transmission Systems and Media, Digital Systems and Networks, Digital terminal equipments—Coding of analogue signals by methods other than PCM, ITU-T G.729.1 Telecommunication Standardization Sector of ITU, May 2006. 100 pages.

"Frame error robust narrow-band and wideband embedded variable bit-rate coding of speech and audio from 8-32 kbit/s," Series G: Transmission Systems and Media, Digital Systems and Networks, Digital terminal equipments—Coding of voice and audio signals, ITU-T G.718 Telecommunication Standardization Sector of ITU, Jun. 2008, 257 pages.

Notification of Transmittal of the International Search Report and the Written Opinion of the International Searching Authority, or the Declaration, Huawei Technologies Co., Ltd., et al., PCT/CN2010/072449, mailing date of Aug. 12, 2010; 14 pages.

* cited by examiner

*Primary Examiner* — Ricky Ngo
*Assistant Examiner* — Rasheed Gidado
(74) *Attorney, Agent, or Firm* — Slater & Matsil, L.L.P.

(57) ABSTRACT

In an embodiment, a method of frequency domain post-processing is disclosed. The method includes applying adaptive modification gain factor to each frequency coefficient, and determining gain factors based on Local Masking Magnitude and Local Masked Magnitude.

19 Claims, 10 Drawing Sheets

SYSTEM AND METHOD FOR FREQUENCY DOMAIN AUDIO POST-PROCESSING BASED ON PERCEPTUAL MASKING

This patent application claims priority to U.S. Provisional Application No. 61/175,573 filed on May 5, 2009, entitled "Frequency Domain Post-processing Based on Perceptual Masking," which application is incorporated by reference herein.

TECHNICAL FIELD

The present invention relates generally to audio signal coding or compression, and more particularly to frequency domain audio signal post-processing.

BACKGROUND

In modern audio/speech digital signal communication systems, a digital signal is compressed at an encoder and the compressed information is packetized and sent to a decoder through a communication channel, frame by frame in real time. A system made of an encoder and decoder together is called a CODEC.

In some applications, speech/audio compression is used to reduce the number of bits that represent the speech/audio signal thereby reducing the bandwidth (bit rate) needed for transmission. However, speech/audio compression may result in degradation of the quality of decompressed signal. In general, a higher bit rate results in higher sound quality, while a lower bit rate results in lower sound quality. Modern speech/audio compression techniques, however, can produce decompressed speech/audio signal of relatively high quality at relatively low bit rates by exploiting the perceptual masking effect of human hearing system.

In general, modern coding/compression techniques attempt to represent the perceptually significant features of the speech/audio signal, without preserving the actual speech/audio waveform. Numerous algorithms have been developed for speech/audio CODECs that reduce the number of bits required to digitally encode the original signal while attempting to maintain high quality of reconstructed signal.

Perceptual weighting filtering is a technology that exploits the human ear masking effect with time domain filtering processing to improve perceptual quality of signal coding or speech coding. This technology has been widely used in many standards during recent decades. One typical application of perceptual weighting is shown in FIG. 1. In FIG. 1, signal 101 is an unquantized original signal that is an input to encoder 110 and also serves as a reference signal for quantization error estimation at summer 112. Signal 102 is an output bitstream from encoder 110, which is transmitted to decoder 114. Decoder 114 outputs quantized signal (or decoded signal) 103, which is used to estimate quantization error 104. Direct error 104 passes through a weighting filter 116 to produce weighted error 105. Instead of minimizing the direct error, the weighted error 105 is minimized so that the spectrum shape of the direct error becomes better in terms of human ear masking effect. Because decoder 114 is placed within the encoder, the whole system is often called a closed-loop approach or an analysis-by-synthesis method.

FIG. 2 illustrates CODEC quantization error spectrums with and without a perceptual weighting filter. Trace 201 is the spectral envelope of the original signal and trace 203 is the error spectrum of direct quantization without adding weighting filter, which is represented as a flat spectrum. Trace 202 is an error spectrum that has been shaped with a perceptual weighting filter. It can be seen that the signal-to-noise ratio (SNR) in spectral valley areas is low without using the weighting filter, although the formant peak areas are perceptually more significant. An SNR that is too low in an audible spectrum location can cause perceptual audible degradation. With the shaped error spectrum, the SNR in valley areas is improved while the SNR in peak areas is higher than in valley areas. The weighting filter is applied in encoder side to distribute the quantization error on the spectrum.

With a limited bit rate, the perceptually significant areas such as spectral peak areas are not overly compromised in order to improve the perceptually less significant areas such as spectral valley areas. Therefore, another method, called post-processing, is used to improve the perceptual quality at decoder side. FIG. 1*b* illustrates a decoder with post-processing block 120. Decoder 122 decodes bitstream 106 to get the quantized signal 107. Signal 108 is the post-processed signal at the final output. Post-processing block 120 further improves the perceptual quality of the quantized signal by reducing the energy of low quality and perceptually less significant frequency components. For time domain CODECs, the post-processing function is often realized by using constructed filters whose parameters are available from the received information of the current decoder. Post-processing can be also performed by transforming the quantized signal into frequency domain, modifying the frequency domain coefficients, and inverse-transforming the modified coefficients back to time domain. Such operations, however, may be too complex for time domain CODECs unless the time domain post-processing parameters are not available or the performance of time domain post-processing is insufficient to meet system requirements.

The psychoacoustic principle or perceptual masking effect is used in some audio compression algorithms for audio/speech equipment. Traditional audio equipment attempts to reproduce signals with fidelity to the original sample or recording. Perceptual coders, on the other hand, reproduce signals to achieve a good fidelity perceivable by the human ear. Although one main goal of digital audio perceptual coders is data reduction, perceptual coding can be used to improve the representation of digital audio through advanced bit allocation. One example of a perceptual coder is a multiband system that divides the audio spectrum in a fashion that mimics the critical bands of psychoacoustics. By modeling human perception, perceptual coders process signals much the way humans do, and take advantage of phenomena such as masking Such systems, however, rely on accurate algorithms. Because is difficult to have a very accurate perceptual model that covers common human hearing behavior, the accuracy of a mathematical perceptual model is limited. However, with limited accuracy, the perceptual coding concept has been implemented by some audio CODECs, hence, numerous MPEG audio coding schemes have benefitted from exploiting the perceptual masking effect. Several ITU standard CODECs also use the perceptual concept. For example, ITU G.729.1 performs so-called dynamic bit allocation based on perceptual masking concept.

FIG. 3 illustrates a typical frequency domain perceptual CODEC. Original input signal 301 is first transformed into the frequency domain to get unquantized frequency domain coefficients 302. Before quantizing the coefficients, a masking function divides the frequency spectrum into many subbands (often equally spaced for simplicity). Each subband dynamically allocates the needed number of bits while making sure that the total number of bits distributed to subbands is not beyond an upper limit. Some subbands even allocate 0 bits if it is judged to be under the masking threshold. Once a determination is made as to what can be discarded, the remainder is allocated the available number of bits. Because bits are not wasted on masked spectrum, bits can be distributed in greater quantity to the rest of the signal. According to allocated bits, the coefficients are quantized and the bitstream 303 is sent to decoder.

Even though perceptual masking concepts have been applied to CODECs, sound quality still has room for improvement due to various reasons and limitations. For example, decoder side post-processing (see FIG. 3*b*) can further improve the perceptual quality of decoded signal produced with limited bit rates. The decoder first reconstructs the quantized coefficients 304, which are then post-processed by a post processing module 310 to get enhanced coefficients 305. An inverse-transformation is performed on the enhanced coefficients to produce final time domain output 306.

The ITU-T G.729.1 standard defines a frequency domain post-processing module for the high band from 4000 Hz to 8000 Hz. This post-processing technology has been described in the U.S. Pat. No. 7,590,523, entitled "Speech Post-processing Using MDCT Coefficients," which is incorporated herein by reference in its entirety.

As the proposed frequency domain post-processing is improved by benefitting from the perceptual masking principle, it is helpful to briefly describe the perceptual masking principle itself.

Auditory perception is based on critical band analysis in the inner ear where a frequency to place transformation occurs along the basilar membrane. In response to sinusoidal pressure, the basilar membrane vibrates producing the phenomenon of traveling waves. The basilar membrane is internally formed by thin elastic fibers tensed across the cochlear duct. As shown in FIG. 4, the fibers are short and closely packed in the basal region, and become longer and sparse proceeding towards the apex of the cochlea. Being under tension, the fibers can vibrate like the strings of a musical instrument. The traveling waves peak at frequency-dependent locations, with higher frequencies peaking closer to more basal locations. FIG. 4 illustrates the relationship between the peak position and the corresponding frequency. Peak position is an exponential function of input frequency because of the exponentially graded stiffness of the basilar membrane. Part of the stiffness change is due to the increasing width of the membrane and part to its decreasing thickness. In other words, any audible sound can lead to the oscillation of the basilar membrane. One specific frequency sound results in the strongest oscillation magnitude at one specific location of the basilar membrane, which means that one frequency corresponds to one location of the basilar membrane. However, even if a stimuli sound wave consists of one specific frequency, the basilar membrane also oscillates or vibrates around the corresponding location but with weaker magnitude. The power spectra are not represented on a linear frequency scale but on a limited frequency bands called critical bands. The auditory system can be described as a bandpass filter bank made of strongly overlapping bandpass filters with bandwidths in the order of 100 Hz for signals below 500 Hz and up to 5000 Hz for signals at high frequencies. Critical bands and their center frequencies are continuous, as opposed to having strict boundaries at specific frequency locations. The spatial representation of frequency on the basilar membrane is a descriptive piece of physiological information about the auditory system, clarifying many psychophysical data, including the masking data and their asymmetry.

Simultaneous Masking is a frequency domain phenomenon where a low level signal, e.g., a small band noise (the maskee) can be made inaudible by simultaneously occurring stronger signal(the masker), e.g., a pure tone, if masker and maskee are close enough to each other in frequency. A masking threshold can be measured below which any signal will not be audible. As an example shown in FIG. 5, the masking threshold depends on the sound pressure level (SPL) and the frequency of the masker, and on the characteristics of the masker and maskee. The slope of the masking threshold is steeper towards lower frequencies, i.e., higher frequencies are more easily masked. Without a masker, a signal is inaudible if its SPL is below the threshold of quiet, which depends on frequency and covers a dynamic range of more than 60 dB.

FIG. 5 describes masking by only one masker. If a source signal has many simultaneous maskers, a global masking threshold can be computed that describes the threshold of just noticeable distortions as a function of frequency. The calculation of the global masking threshold is based on a high resolution short term amplitude spectrum of the audio or speech signal, which is sufficient for critical band based analysis. In a first step, individual masking thresholds are calculated depending on the signal level, the type of masker (noise or tone), and frequency range of the speech signal. Next, the global masking threshold is determined by adding individual thresholds and the threshold in quiet. Adding this later threshold ensures that the computed global masking threshold is not below the threshold in quiet. The effects of masking reaching over critical band bounds are included in the calculation. Finally, the global signal-to-mask ratio (SMR) is determined as the ratio of the maximum of signal power and global masking threshold. As shown in FIG. 5, the noise-to-mask ratio (NMR) is defined as the ratio of quantization noise level to masking threshold, and SNR is the signal-to-noise ratio. Minimum perceptible difference between two stimuli is called just noticeable difference (JND). The JND for pitch depends on frequency, sound level, duration, and suddenness of the frequency change. A similar mechanism is responsible for critical bands and pitch discrimination.

FIGS. 6*a* and 6*b* illustrate the asymmetric nature of simultaneous masking FIG. 6*a* shows an example of noise-masking-tone (NMT) at the threshold of detection, which in this example is a 410 Hz pure tone presented at 76 dB SPL and just masked by a critical bandwidth narrowband noise centered at 410 Hz (90 Hz BW) of overall intensity 80 dB SPL. This corresponds to a threshold minimum signal-to-mask ratio of 4 dB. The threshold SMR increases as the probe tone is shifted either above or below 410 Hz. FIG. 6*b* represents Tone-masking-noise (TMN) at the threshold of detection, which in this example is a 1000 Hz pure tone presented at 80 dB SPL just masks a critical band narrowband noise centered at 1000 Hz of overall intensity 56 dB SPL. This corresponds to a threshold minimum signal-to-mask ratio of 24 dB. The threshold SMR for tone-masking-noise increases as the masking tone is shifted either above or below the noise center frequency, 1000 Hz. When comparing FIG. 6*a* to FIG. 6*b*, a "masking asymmetry" is apparent, namely that NMT produces a smaller threshold minimum SMR (4 dB) than does TMN (24 dB).

In summary, the masking effect can be summarized as a few points:

A louder sound may often render a softer sound inaudible, depending on the relative frequencies and loudness of the two sounds;

Pure tones close together in frequency mask each other more than tones widely separated in frequency;

A pure tone masks tones of higher frequency more effectively than tones of lower frequency;

- The greater the intensity of the masking tone, the broader the range of frequencies it can mask;
- Masking effect spreads more in high frequency area than in low frequency area;
- Masking effect at a frequency strongly depends on the neighborhood spectrum of the frequency; and
- The "masking asymmetry" is apparent in the sense that the masking effect of noise as masker is much stronger (smaller SMR) than a tone as a masker.

G.722 is an ITU standard CODEC that provides 7 kHz wideband audio at data rates from 48, 56 and 64 kbit/s. This is useful, for example, in fixed network voice over IP applications, where the required bandwidth is typically not prohibitive, and offers an improvement in speech quality over older narrowband CODECs such as G.711, without an excessive increase in implementation complexity. The coding system uses sub-band adaptive differential pulse code modulation (SB-ADPCM) with a bit rate of 64 kbit/s. In the SB-ADPCM technique used, the frequency band is split into two sub-bands (higher and lower band) and the signals in each sub-band are encoded using ADPCM technology. The system has three basic modes of operation corresponding to the bit rates used for 7 kHz audio coding: 64, 56 and 48 kbit/s. The latter two modes allow an auxiliary data channel of 8 and 16 kbit/s respectively to be provided within the 64 kbit/s by making use of bits from the lower sub-band.

FIG. 7*a* is a block diagram of the SB-ADPCM encoder. The transmit quadrature mirror filters (QMFs) have two linear-phase non-recursive digital filters that split the frequency band of 0 to 8000 Hz into two sub-bands: the lower sub-band being 0 to 4000 Hz, and the higher sub-band being 4000 to 8000 Hz. Input signal 701 $x_{in}$ 701 to the transmit QMFs 720 is sampled at 16 kHz. Outputs, $x_H$ 702 and $x_L$ 703 for the higher and lower sub-bands, respectively, are sampled at 8 kHz. The lower sub-band input signal after subtraction of an estimate of the input signal produces a difference signal that is adaptively quantized by assigning 6 binary digits to have a 48 kbit/s signal $I_L$ 705. A 4-bit operation, instead of 6-bit operation, is used in both the lower sub-band ADPCM encoder 722 and in the lower sub-band ADPCM decoder 732 (FIG. 7*b*) to allow the possible insertion of data in the two least significant bits. The higher sub-band input signal $x_H$ 702, after subtraction of an estimate of the input signal, produces the difference signal which is adaptively quantized by assigning 2 binary digits to have 16 kbit/s signal $I_H$ 704.

FIG. 7*b* is a block diagram of a SB-ADPCM decoder. De-multiplexer (DMUX) 730 decomposes the received 64 kbit/s octet-formatted signal $I_r$, 707 into two signals, $h_r$. 709 and $I_H$ 708, which form codeword inputs to the lower and higher sub-band ADPCM decoders, respectively. Low sub-band ADPCM decoder 732 reconstructs $r_L$ 711 follows the same structure of ADPCM encoder 722 (See FIG. 7*a*), and operates in any of three possible variants depending on the received indication of the operation mode. High-band ADPCM decoder 734 is identical to the feedback portion of the higher sub-band ADPCM encoder 724, the output being the reconstructed signal $r_H$ 710. Receive QMFs 736 shown in FIG. 7*b* are made of two linear-phase non-recursive digital filters that interpolate outputs $r_L$ 711 and $r_H$ 710 of the lower and higher sub-band ADPCM decoders 732 and 734 from 8 kHz to 16 kHz and then produces output $x_{out}$ 712 sampled at 16 kHz. Because the high band ADPCM bit rate is much lower than the low band ADPCM, the quality of the high band is relatively poor.

G.722 Super Wideband Extension means that the wideband portion from 0 to 8000 Hz is still coded with G.722 CODEC while the super wideband portion from 8000 to 14000 Hz of the input signal is coded by using a different coding approach, where the decoded output of the super wideband portion is combined with the output of G.722 decoder to enhance the quality of the final output sampled at 32 kHz. Higher layers at higher bit rates of G.722 Super Wideband Extension can also be used to further enhance the quality of the wideband portion from 0 to 8000 Hz.

The ITU-T G.729.1/G.718 super wideband extension is a recently developed standard that is based on a G.729.1 or G.718 CODEC as the core layer of the extended scalable CODEC. The core layer of G.729.1 or G.718 encodes and decodes the wideband portion from 50 to 7000 Hz and outputs a signal sampled at 16 kHz. The extended layers add the encoding and decoding of the super wideband portion from 7000 to 14000 Hz. The extended layers output a final signal sampled at 32 kHz. The high layers of the extended scalable CODEC also add the enhancements and improvements of the wideband portion (50-7000 Hz) to the coding error produced by G.729.1 or G.718 CODEC.

The ITU-T G.729.1 encoder is also called a G.729EV coder, which is an 8-32 kbit/s scalable wideband (50-7000 Hz) extension of ITU-T Rec. G.729. By default, the encoder input and decoder output are sampled at 16 kHz. The bitstream produced by the encoder is scalable and has 12 embedded layers, which will be referred to as Layers 1 to 12. Layer 1 is the core layer corresponding to a bit rate of 8 kbit/s. This layer is compliant with G.729 bitstream, which makes G.729EV interoperable with G.729. Layer 2 is a narrowband enhancement layer adding 4 kbit/s, while Layers 3 to 12 are wideband enhancement layers adding 20 kbit/s with steps of 2 kbit/s.

This coder operates with a digital signal sampled at 16000 Hz followed by conversion to 16-bit linear PCM for the input to the encoder. A 8000 Hz input sampling frequency is also supported. Similarly, the format of the decoder output is 16-bit linear PCM with a sampling frequency of 8000 Hz or 16000 Hz. Other input/output characteristics are converted to 16-bit linear PCM with 8000 or 16000 Hz sampling before encoding, or from 16-bit linear PCM to an appropriate format after decoding.

The G.729EV coder is built upon a three-stage structure: embedded Code-Excited Linear-Prediction (CELP) coding, Time-Domain Bandwidth Extension (TDBWE) and predictive transform coding that will be referred to as Time-Domain Aliasing Cancellation (TDAC). The embedded CELP stage generates Layers 1 and 2 which yield a narrowband synthesis (50-4000 Hz) at 8 and 12 kbit/s. The TDBWE stage generates Layer 3 and allows producing a wideband output (50-7000 Hz) at 14 kbit/s. The TDBWE algorithm is also borrowed to perform FEC Frame Erasure Concealment (FEC) or Packet Loss Concealment (PLC) for layers higher than 14 kbps. The TDAC stage operates in the Modified Discrete Cosine Transform (MDCT) domain and generates Layers 4 to 12 to improve quality from 16 to 32 kbit/s. TDAC coding represents jointly the weighted CELP coding error signal in the 50-4000 Hz band and the input signal in the 4000-7000 Hz band. The G.729EV coder operates on 20 ms frames. However, embedded CELP coding stage operates on 10 ms frames, like G.729. As a result two 10 ms CELP frames are processed per 20 ms frame.

G.718 is an ITU-T standard embedded scalable speech and audio CODEC providing high quality narrowband (250 Hz to 3500 Hz) speech over the lower bit rates and high quality wideband (50 Hz to 7000 Hz) speech over a complete range of bit rates. In addition, G.718 is designed to be robust to frame erasures, thereby enhancing speech quality when used in internet protocol (IP) transport applications on fixed, wireless and mobile networks. The CODEC has an embedded scalable structure, enabling maximum flexibility in the transport of voice packets through IP networks of today and in future media-aware networks. In addition, the embedded structure of G.718 allows the CODEC to be extended to provide a super-wideband (50 Hz to 14000 Hz). The bitstream may be truncated at the decoder side or by any component of the communication system to instantaneously adjust the bit rate to the desired value without the need for out-of-band signaling. The encoder produces an embedded bitstream structured in five layers corresponding to the five available bit rates: 8, 12, 16, 24 & 32 kbit/s.

The G.718 encoder can accept wideband sampled signals at 16 kHz, or narrowband signals sampled at either 16 KHz or 8 kHz. Similarly, the decoder output can be 16 kHz wideband, in addition to 16 kHz or 8 kHz narrowband. Input signals sampled at 16 kHz, but with bandwidth limited to narrowband, are detected by the encoder. The output of the G.718 CODEC operates with a bandwidth of 50 Hz to 4000 Hz at 8 and 12 kbit/s, and 50 Hz to 7000 Hz from 8 to 32 kbit/s. The CODEC operates on 20 ms frames and has a maximum algorithmic delay of 42.875 ms for wideband input and wideband output signals. The maximum algorithmic delay for narrowband input and narrowband output signals is 43.875 ms. The CODEC is also employed in a low-delay mode when the encoder and decoder maximum bit rates are set to 12 kbit/s. In this case, the maximum algorithmic delay is reduced by 10 ms.

The CODEC also incorporates an alternate coding mode, with a minimum bit rate of 12.65 kbit/s, which is a bitstream interoperable with ITU-T Recommendation G.722.2, 3GPP AMR-WB and 3GPP2 VMR-WB mobile wideband speech coding standards. This option replaces Layer 1 and Layer 2, and the layers 3-5 are similar to the default option with the exception that in Layer 3 few bits are used to compensate for the extra bits of the 12.65 kbit/s core. The decoder further decodes other G.722.2 operating modes. G.718 also includes discontinuous transmission mode (DTX) and comfort noise generation (CNG) algorithms that enable bandwidth savings during inactive periods. An integrated noise reduction algorithm can be used provided that the communication session is limited to 12 kbit/s.

The underlying algorithm is based on a two-stage coding structure: the lower two layers are based on Code-Excited Linear Prediction (CELP) coding of the band (50-6400 Hz), where the core layer takes advantage of signal-classification to use optimized coding modes for each frame. The higher layers encode the weighted error signal from the lower layers using overlap-add modified discrete cosine transform (MDCT) transform coding. Several technologies are used to encode the MDCT coefficients to maximize the performance for both speech and music.

SUMMARY OF THE INVENTION

In one embodiment, a method of frequency domain post-processing includes applying adaptive modification gain factor to each frequency coefficient, determining the gain factors based on Local Masking Magnitude, Local Masked Magnitude, and Average Magnitude. In an embodiment, Local Masking Magnitude $M_0(i)$ is estimated according to perceptual masking effect by taking a weighted sum around the location of the specific frequency at i:

$$M_0(i) = \sum_k w_0^i(k) \cdot |F_0(i+k)|$$

where the weighting window $w_0^i(k)$ is frequency dependent, $F_0(i)$ are the frequency coefficients before the post-processing is applied. Local Masked Magnitude $M_1(i)$ is estimated by taking a weighted sum around the location of the specific frequency at i similar to $M_0(i)$:

$$M_1(i) = \sum_k w_1^i(k) \cdot |F_0(i+k)|$$

where the weighting window $w_1^i(k)$ is frequency dependent, which is flatter and longer than $w_0^i(k)$. Average Magnitude $M_{av}$ is calculated on the whole spectrum band before the post-processing is performed.

In one example, the initial gain factor for each frequency is calculated as $$Gain_0(i) = \frac{M_0(i)}{\alpha \cdot M_1(i) + (1-\alpha) \cdot M_{av}}$$

where $\alpha$ ($0 \leqq \alpha \leqq 1$) is a value close to 1. The gain factors can be further normalized to maintain the energy. In one embodiment, normalized gain factors $Gain_1(i)$ are controlled by a parameter:

$$Gain_2(i) = \beta \cdot Gain_1(i) + (1-\beta)$$

where $\beta$ ($0 \leqq \beta \leqq 1$) is a parameter to control strong post-processing or weak post-processing; this controlling parameter can be replaced by a smoothed one.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In an embodiment, a post-processor working in the frequency domain at the decoder side is proposed to enhance the perceptual quality of music, audio or speech output signals. In one embodiment, post-processing is implemented by multiplying an adaptive gain factor to each frequency coefficient. The adaptive gain factors are estimated using the principle of perceptual masking effect.

In one aspect, the initial gain factors are calculated by comparing the mathematical values of the three defined parameters named as Local Masking Magnitude, Local Masked Magnitude, and Average Magnitude. The gain factors are then normalized to keep proper overall energy. In another aspect, the degree of the post-processing can be strong or weak, which is controlled depending on the real quality of decoded signal and other possible factors.

Figure 8:
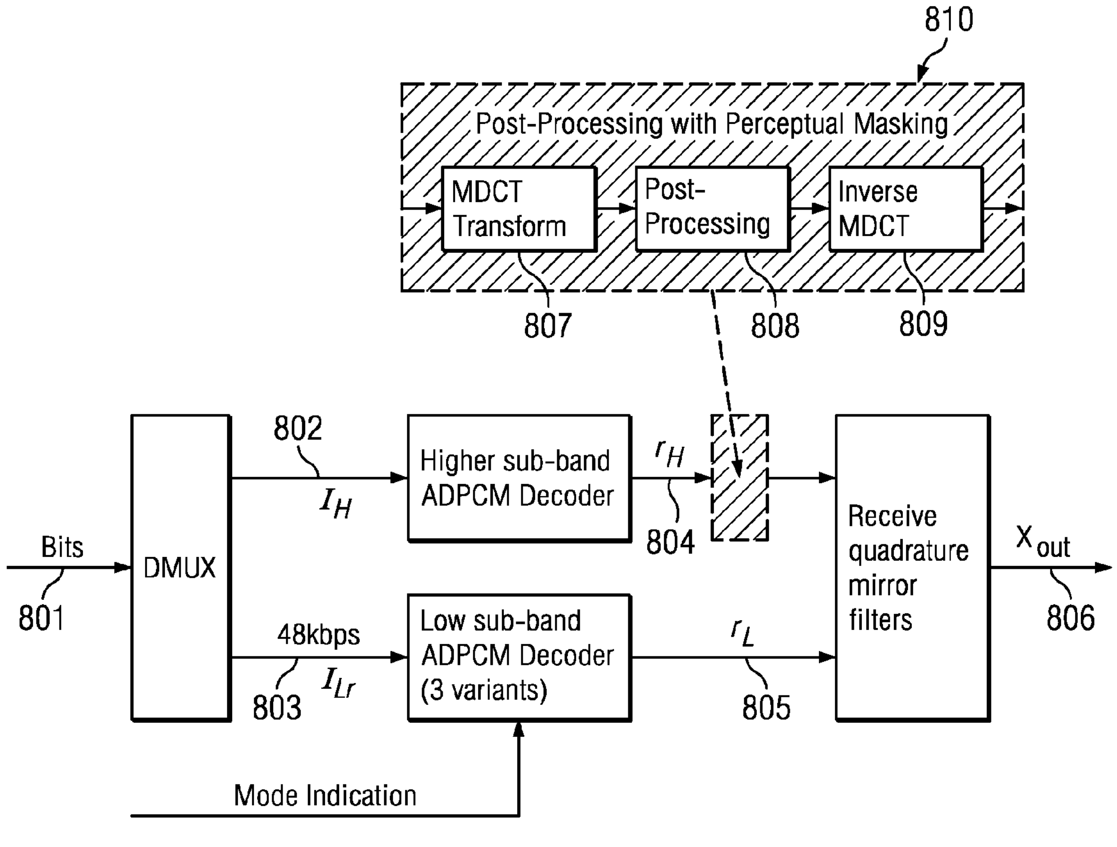
FIG. 8 illustrates block diagram of an embodiment G.722 decoder with added post-processing.
Figure 9:
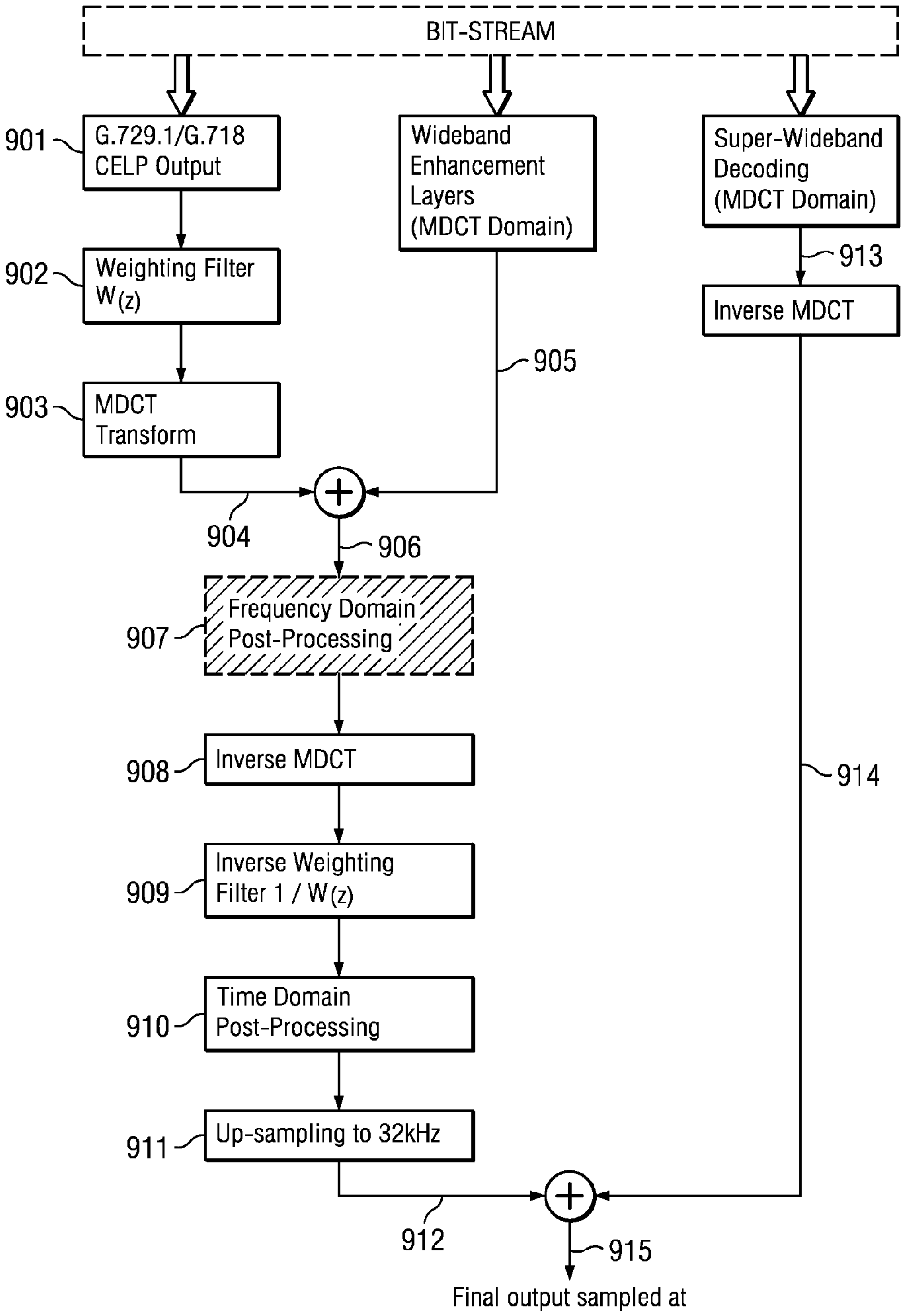
FIG. 9 illustrates a block diagram of an embodiment G.729.1/G.718 super-wideband extension system with post-processing.

In some embodiments, frequency domain post-processing is used rather than time domain post-processing. For example, when frequency domain coefficients are already available at decoder, frequency domain post-processing may be simpler to perform than time domain post-processing. Also, in some cases, time domain post-processing may encounter difficulty improving quality for music signals, so frequency domain post-processing is used instead. Further more if there are no time domain parameters available to support time domain post-processing and frequency domain post-processing is not more complex than time domain post-processing, frequency domain processing is used in some embodiments. FIG. 8 and FIG. 9 illustrate two embodiments in which frequency domain post-processing is used to improve the perceptual quality without spending extra bits.

FIG. 8 illustrates a possible location to place an embodiment frequency post-processer to improve G.722 CODEC quality. As described above for G.722, the high band is coded with ADPCM algorithm at relatively very low bit rate and the quality of the high band is lower compared to the low band. One way to improve the high band is to increase the bit rate, however, if the added bit rate is limited, the quality may still need to be improved. In an embodiment, post-processing block 810 is placed at the decoder in the high band decoding path. Alternatively, the post-processor can be placed in other places within the system.

In FIG. 8, received bitstream 801 is split into high band information $I_H$ 802 and low band information $I_{Lr}$ 803. In an embodiment, output $r_L$ 805 of low band ADPCM decoder 822 is directly upsampled and filtered with receive quadrature mirror filter 820. However, output $r_H$ 804 of the high band ADPCM decoder 24 is first post-processed before being upsampled and filtered with receive quadrature mirror filter 820. In an embodiment, a frequency domain post-processing approach is selected here, partially because there are no available parameters to do time domain post-processing. Alternatively, such frequency domain post processing is performed even when some time domain parameters are available. As the high band output signal $r_H$ 804 is a time domain signal that is transformed into the frequency domain by MDCT transformation block 807, and then enhanced by the frequency domain post-processer 808. The enhanced frequency coefficients are then inverse-transformed back into the time domain by Inverse MDCT block 809. In an embodiment, the post-processed high band and the low band signals sampled at 8 kHz are upsampled and filtered to get the final output 806 $x_{out}$ sampled at 16 kHz. In alternative embodiments, other sample rates and system topologies can be used.

FIG. 9 illustrates a further system using embodiment frequency post-processing systems and methods to enhance the music quality for the recently developed ITU-T G.729.1/G.718 super-wideband extension standard CODEC. The CODEC cores of G.729.1/G.718 are based on CELP algorithm that produces high quality speech with relatively simple time-domain post-processing. One drawback of CELP algorithm, however, is that the music quality obtained by CELP type CODEC is often of poor sound quality. Although the added MDCT enhancement layers can improve the quality of the band containing CELP contribution, sometimes the music quality is still not good enough, so that the added frequency domain post-processing can help.

One of the advantage of embodiments that incorporate frequency domain post-processing over the time-domain post-processing is its ability to enhance not only regular harmonics (equally spaced harmonics) but also irregular harmonics (not equally spaced harmonics). Equally spaced harmonics correspond to periodic signals, which is the case of voiced speech. Music signals, on the other hand, often have irregular harmonics. The ITU-T G.729.1/G.718 super-wideband extension standard decoder receives three portions of a bitstream; the first portion is used to decode the core of G.729.1 or G.718; the second portion is used to decode the MDCT enhancement layers for improving the band from 50 to 7000 Hz; and the third portion is transmitted to reconstruct the super-wideband from 7000 Hz to 14000 Hz.

In embodiments using a G.729.1 core, G.729.1 CELP decoder 901 outputs a time domain signal representing the narrow band, sampled at 8 kHz, and output 905 from enhancement layers 920 adds high band MDCT coefficients (4000-7000 Hz) and the narrow band MDCT coefficients (50-4000 Hz) to improve the coding of CELP error in the weighted domain. In embodiments that use a G.718 core, G.718 CELP decoder 901 outputs the time domain signal representing the band from 50 Hz to 6400 Hz, which is sampled at 16 kHz. Output 905 from the enhancement layers 920 adds high band MDCT coefficients (6400-7000 Hz) and improvement MDCT coefficients of the band from 50 Hz to 6400 Hz in the weighted domain. The time domain signal from the core CELP output is weighted through the weighting filter 902 and then transformed into MDCT domain by the block 903. Coefficients 904 obtained from MDCT block 903 is added together with the reconstructed coefficients 905 of the enhancement layers to form a complete set MDCT coefficients 906 representing frequencies from 50 Hz to 7000 Hz in the weighted domain.

In some embodiments, MDCT coefficients 906 are ready to be post-processed by the embodiment frequency domain post-processing block 907. In an embodiment, post-processed coefficients are inverse-transformed back into the time domain by Inverse MDCT block 908. This time domain signal is still in the weighted domain and it can be further post-processed for special purposes such as echo reduction. The weighted time domain signal is then filtered with the inverse weighting filter 909 to get the signal output in normal time domain.

In an embodiment that uses a G.729.1/G.718 super-wideband extension CODEC, the signal in normal time domain is post-processed again with the time domain post-processing block 910 and then up-sampled to the final output sampling rate 32 kHz before added to super-wideband output 914. Super-wideband MDCT coefficients 913 are decoded in the MDCT domain by block 924 and transformed into time domain by inverse MDCT transformation 922. The final time domain output 915 sampled at 32 kHz covers the decoded spectrum from 50 Hz to 14,000 Hz.

Figure 10:
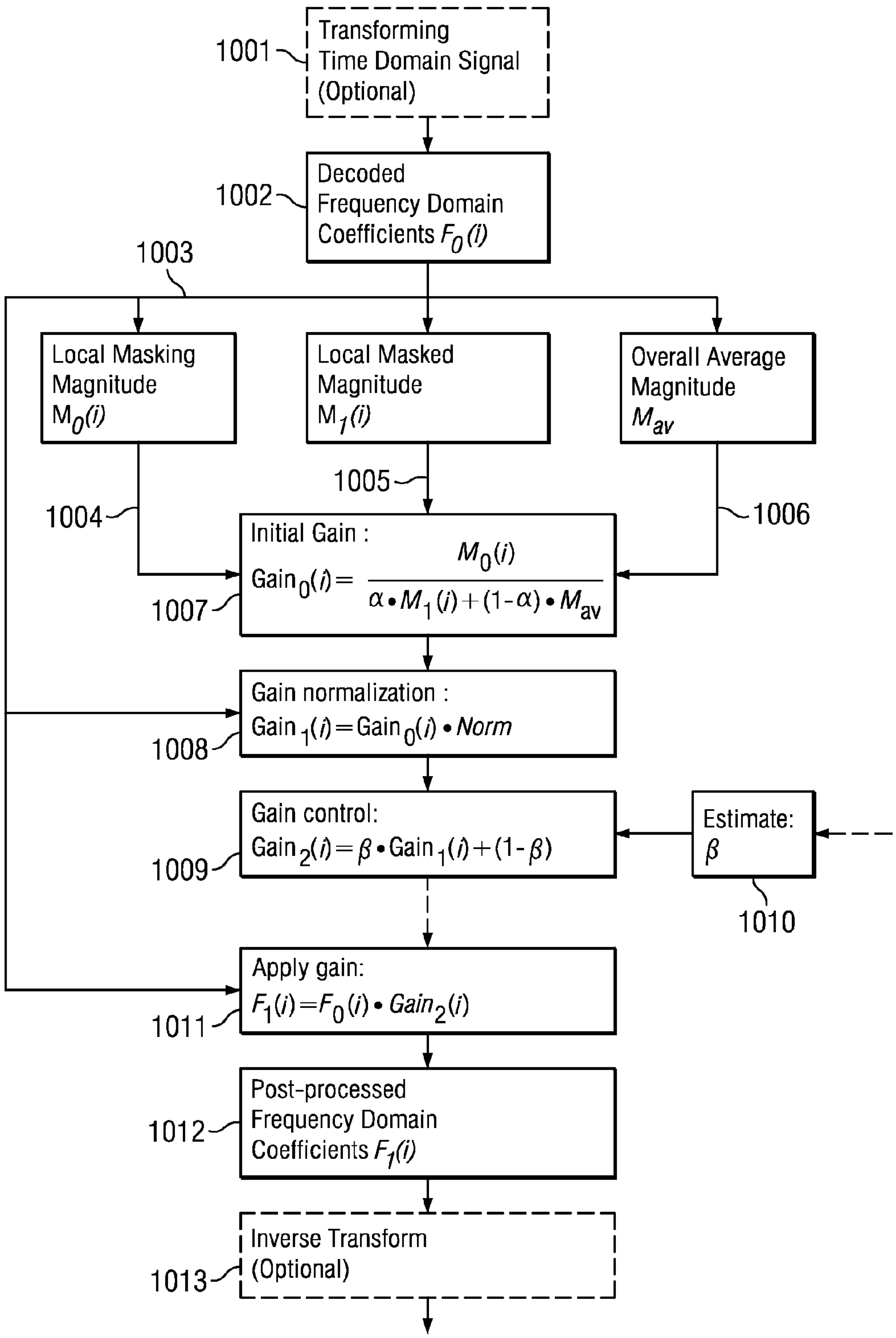
FIG. 10 illustrates an embodiment frequency domain post-processing approach.

FIG. 10 illustrates a block diagram of an embodiment frequency domain post-processing approach based on the perceptual masking effect. Block 1001 transforms a time domain signal into the frequency domain. In embodiments, where the received bitstream is decoded in frequency domain, the transformation of time domain signal into frequency domain may not be needed, hence block 1001 is optional. The post-processing of the decoded frequency domain coefficients in block 1002 includes applying a gain factor of around a value of about 1.0 to each frequency coefficient $F_0(i)$ to perceptually improve overall sound quality. In some embodiments, this value ranges between 0.5 to 1.2, however, other values outside of this range can be used depending on the application and its specifications.

In some embodiments, CELP post processing filters of ITU-T G.729.1/G.718 super-wideband extension may perform well for normal speech signal, however, for some music signals, frequency domain post-processing can increase output sound quality. In the decoder of ITU-T G.729.1/G.718 super-wideband extension, the MDCT coefficients of the frequency region [0-7 kHz] are available in weighted domain, having in total 280 coefficients: $F_0(i)=\hat{M}_{16}(i)$, i=0,1, . . . 279. In embodiments, these frequency coefficients are used to perform frequency domain post-processing for music signals before the music signals are transformed back into time domain. Such processing can also be used for other audio signals besides music, in further embodiments.

Since the gain factor for each frequency coefficient may be different for different frequencies, the spectrum shape is modified after the post-processing. In embodiments, a gain factor estimation algorithm is used in frequency domain post-processing. In some embodiments, gain factor estimation algorithm is based on the perceptual masking principle.

Figure 1A:
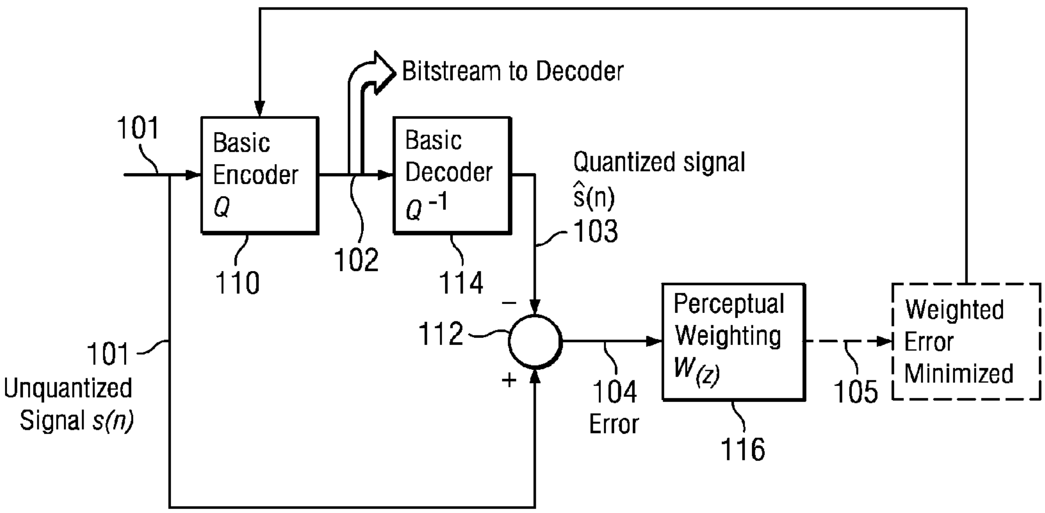
FIG. 1a (PRIOR ART)
FIGS. 1*a* and 1*b* illustrate a typical time domain CODEC.
Figure 1B:
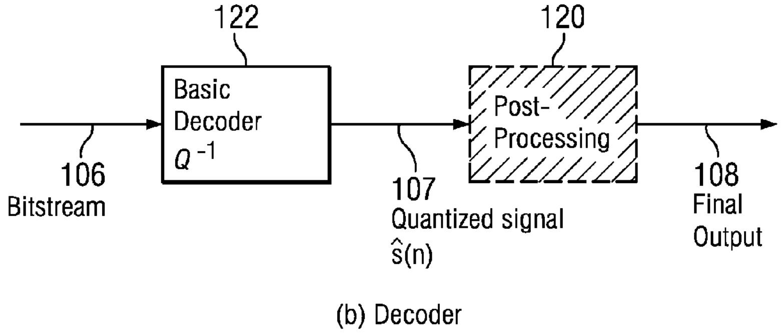
FIG. 1b (PRIOR ART)
Figure 2:
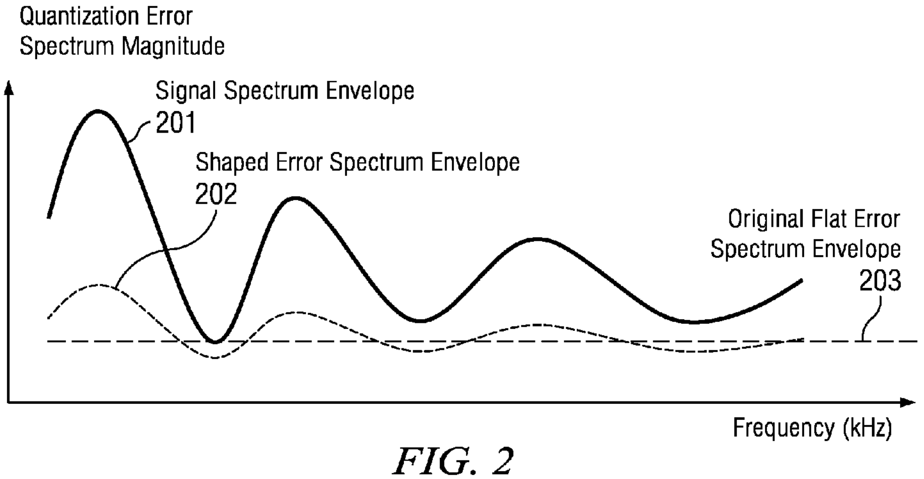
FIG. 2 (PRIOR ART)
FIG. 2 illustrates a quantization (coding) error spectrum with/without perceptual weighting filter.
Figure 3A:
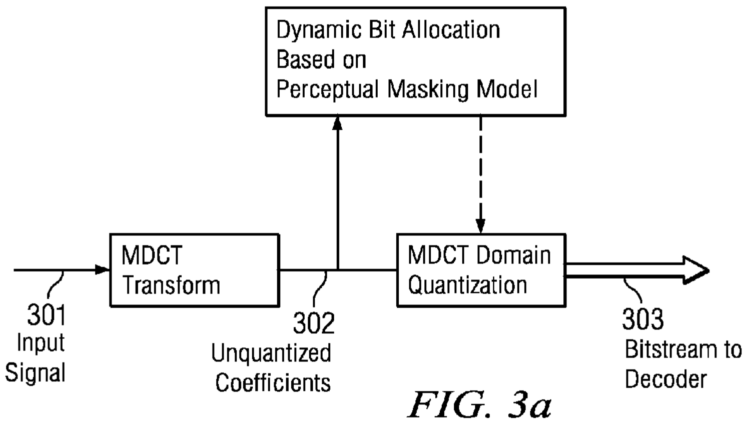
FIG. 3a (PRIOR ART)
FIGS. 3*a* and 3*b* illustrate a typical frequency domain CODEC with perceptual masking model in encoder and post-processing in decoder.
Figure 3B:
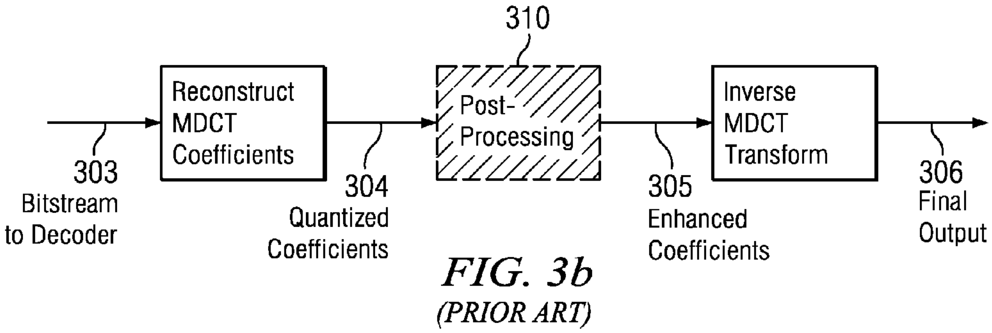
FIG. 3b (PRIOR ART)
Figure 4:
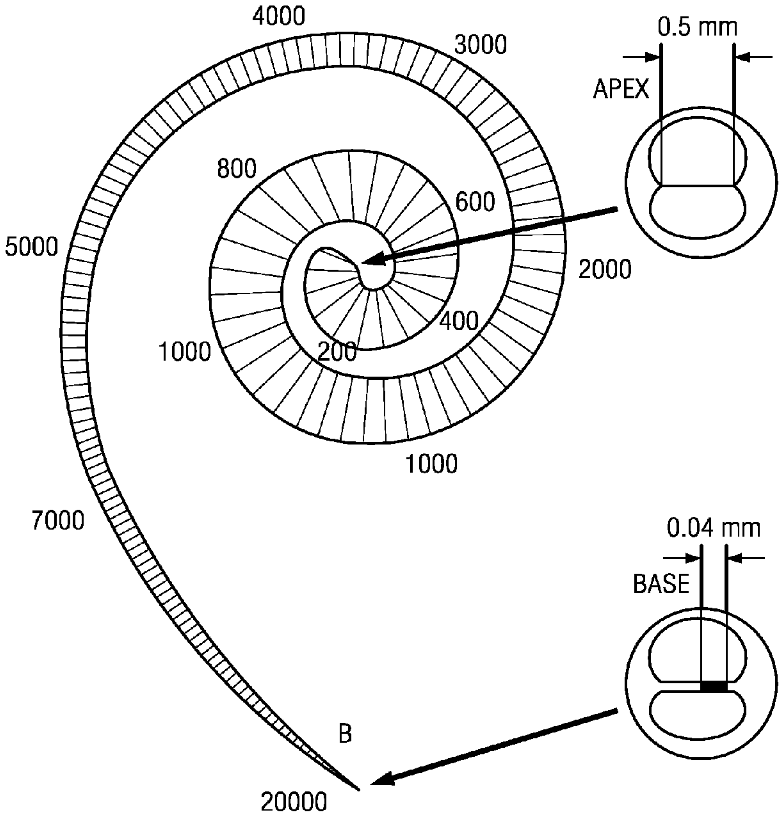
FIG. 4 illustrates a basilar membrane vibration traveling wave's peak at frequency-dependent locations along the basilar membrane.

When encoding the signal in the time domain using a perceptual weighting filter, as shown in FIG. 1 and FIG. 2, the frequency coefficients of the decoded signal have better quality in the perceptually more significant areas and worse quality in the perceptually less significant areas. Similarly, when the encoder quantizes the frequency coefficients using a perceptual masking model, as shown in FIG. 3, the perceptual quality of the decoded frequency coefficients is not equally (uniformly) distributed on the spectrum. Frequencies having sufficient quality can be amplified by multiplying a gain factor slightly larger than 1, whereas frequencies having poorer quality can be multiplied by gains less than 1 and/or reduced to a level below the estimated masking threshold.

Turning back to FIG. 10, in embodiments, three parameters are used, which are respectively called Local Masking Magnitude $M_0(i)$ 1004, Local Masked Magnitude $M_1(i)$ 1005, and Overall Average Magnitude $M_{av}$ 1006. These three parameters are estimated using the decoded frequency coefficients 1003. The estimation of $M_0(i)$ and $M_1(i)$ is based on the perceptual masking effect.

Figure 5:
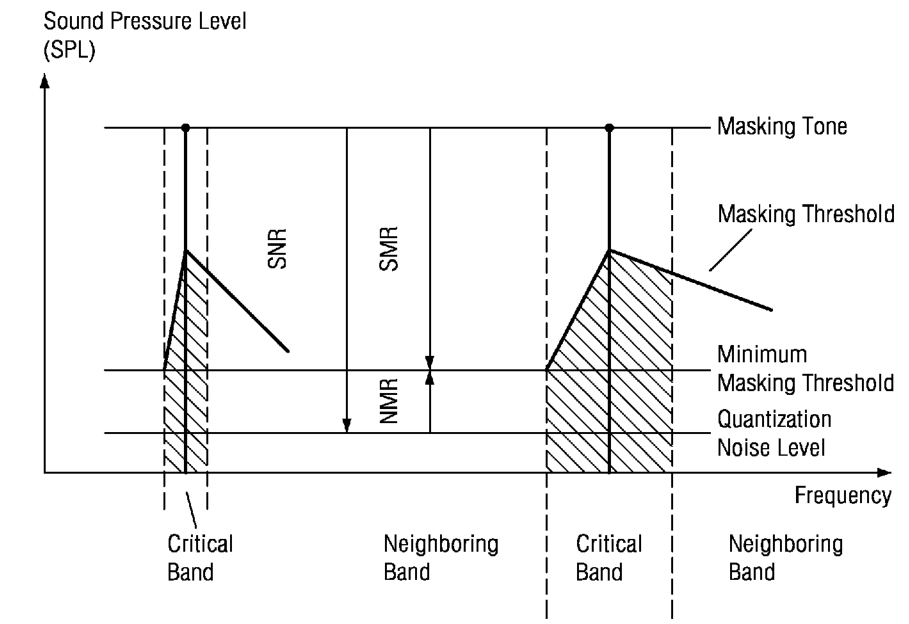
FIG. 5 (PRIOR ART)
FIG. 5 illustrates a masking threshold and signal to masking ratio.
Figure 6A:
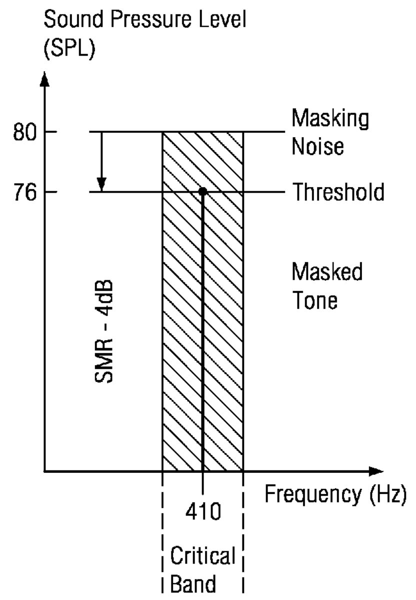
FIG. 6a (PRIOR ART)
FIGS. 6*a* and 6*b* illustrate the asymmetry of simultaneous masking.
Figure 6B:
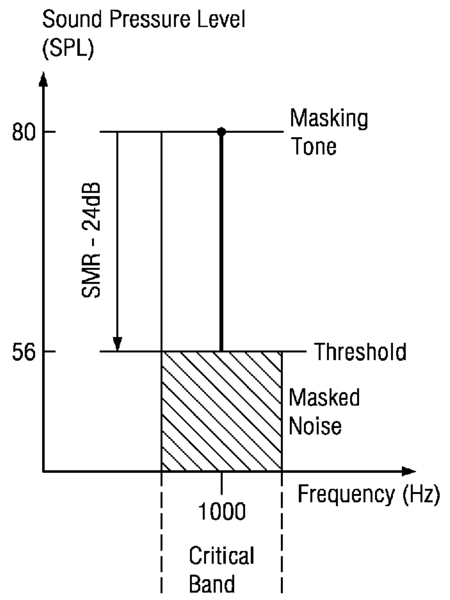
FIG. 6b (PRIOR ART)
Figure 7A:
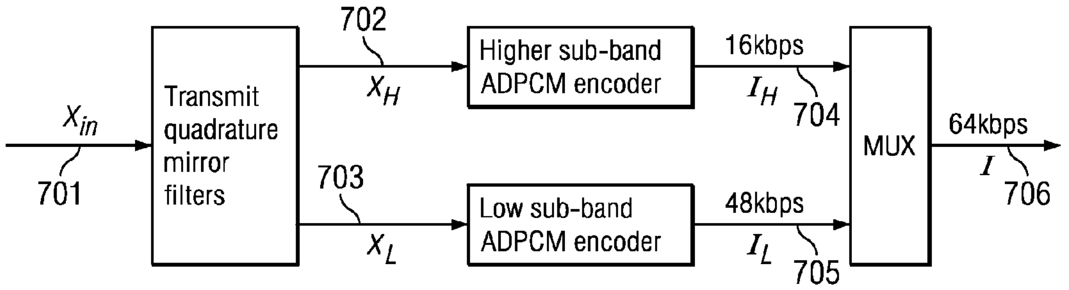
FIG. 7a (PRIOR ART)
FIGS. 7*a* and 7*b* illustrate block diagrams of a G.722 encoder and decoder.
Figure 7B:
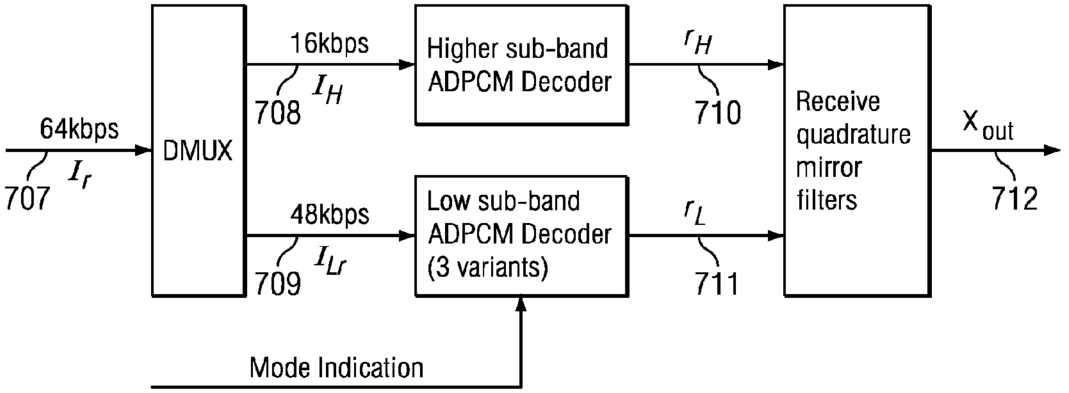
FIG. 7b (PRIOR ART)
Figure 11:
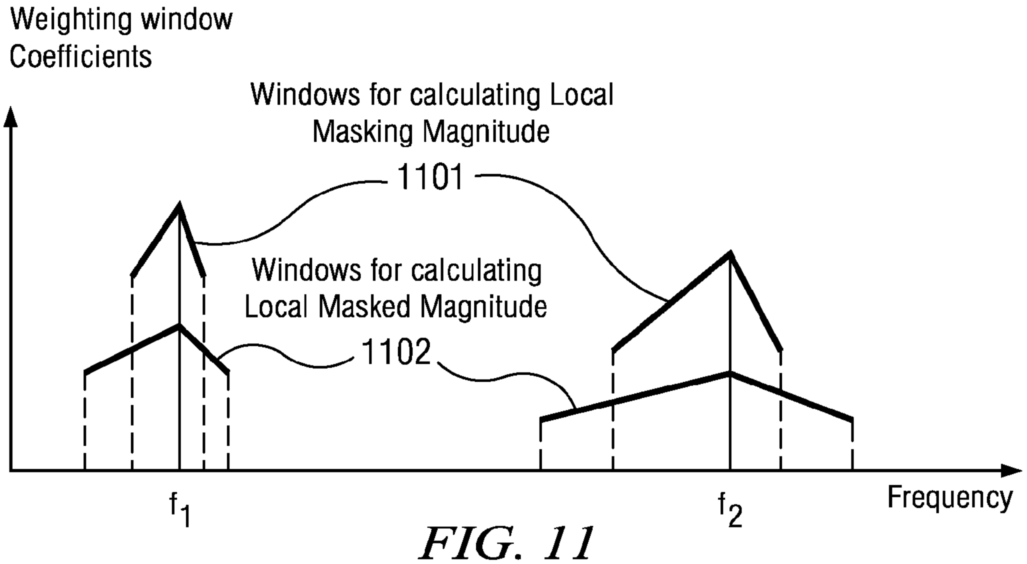
FIG. 11 illustrates embodiment weighting windows.

As described hereinabove with respect to FIG. 5, if one frequency acts as a masking tone, this masking tone influences more area above the tone frequency and less area below the tone frequency. The influencing range of the making tone is larger when it is located in high frequency region than in low frequency region. The masking threshold curves in FIG. 5 are formed according to the above principle. Usually, however, real signals do not consist of just a tone. If the spectrum energy exists in a related band, the "perceptual loudness" at a specific frequency location i depends not only on the energy at the location i but also on the energy distribution around its location. Local Masking Magnitude $M_0(i)$ is viewed as the "perceptual loudness" at location i and estimated by taking a weighted sum of the spectral magnitudes around it:

$$M_0(i) = \sum_k w_0^i(k) \cdot |F_0(i+k)|, \tag{1}$$

where $F_0(i)$ represents the frequency coefficients before the post-processing is applied. In some embodiments, the weighting window $w_0^i(k)$ is not symmetric. One example of the weighting window $w_0^i(k)$ 1101 is shown in FIG. 11. In terms of the perceptual principle that the "perceptual loudness" at location i is contributed more from frequencies below i and less from frequencies above i, and the "perceptual loudness" influence is more spread at higher frequency area than lower frequency area, in some embodiments, the weighting window $w_0^i(k)$ meets two conditions. The first condition is that the tail of the window is longer at the left side than the right side of i, and the second condition is that the total window size is larger for higher frequency area than lower frequency area. In alternative embodiments, however, other conditions can be used in addition to or in place of these two conditions.

In some embodiments, the weighting window $w_0^i(k)$ is different for every different i. In other embodiments, however, the window is the same for a small interval on the frequency index for the sake of simplicity. In embodiments, window coefficients can be pre-calculated, normalized, and saved in tables.

Local Masked Magnitude $M_1(i)$ is viewed as the estimated local "perceptual error floor." Because the encoder encodes a signal in the perceptual domain, high energy frequency coefficients at decoder side can have low relative error but high absolute error and low energy frequency coefficient at decoder side can have high relative error but low absolute error. The errors at different frequencies also perceptually influence each other in a way similar to the masking effect of a normal signal. Therefore, in some embodiments, the Local Masked Magnitude $M_1(i)$ is estimated similarly to $M_0(i)$:

$$M_1(i) = \sum_k w_1^i(k) \cdot |F_0(i+k)| \tag{2}$$

Here, the shape of the weighting window $w_1^i(k)$ 1102 is flatter and longer than $w_0^i(k)$ as shown in FIG. 11. Like $w_0^i(k)$, the window $w_1^i(k)$ is theoretically different for every different i, in some embodiments. In other embodiments, such as some practical applications, the window can be the same for a small interval on the frequency index for the sake of simplicity. In further embodiments, window coefficients can be pre-calculated, normalized, and saved in tables.

In embodiments, the ratio $M_0(i)/M_1(i)$ reflects the local relative perceptual quality at location i. Considering the possible influence of global energy, one way to initialize the estimate of the gain factor along the frequency is described in the block 1007:

$$Gain_0(i) = \frac{M_0(i)}{\alpha \cdot M_1(i) + (1-\alpha) \cdot M_{av}}, \tag{3}$$

where α (0≦α≦1) is a value close to 1. In some embodiments, α=15/16. In further embodiments, other values for a can be used, for example, between 0.9 and 1.0. In some embodiments, α is used to control the influence of the global energy which is represented here by the overall spectrum average magnitude 1006:

$$M_{av} = \sum_i |F_0(i)| / N_F,$$

where, $N_F$ is the total number of the frequency coefficients. In some embodiments, for example, to avoid too much overall energy change after the post-processing, gain normalization 1008 is applied. The whole spectrum band can be divided into few sub-bands and then the gain normalization is performed on each sub-band by multiplying a factor Norm as shown in the block 1008:

$$Gain_1(i) = Gain_0(i) \cdot Norm. \tag{4}$$

In embodiments that apply full gain normalization, normalization factor Norm is defined as, $$Norm = \sqrt{\frac{\sum_i |F_0(i)|^2}{\sum_i |Gain_0(i) \cdot F_0(i)|^2}} \tag{5}$$

If partial normalization is used, the real normalization factor could be a value between Norm of Equation (5) and 1. Alternatively, if it is known that the quality of some sub-band is poor, for example, in cases of rough quantization precision and low signal level, a the real normalization factor could be below Norm of (5).

In some embodiments, the gain factor estimated with Equation (3) indicates that strong post-processing is needed. In other embodiments, and in some real applications, sometimes only weak post-processing or even no post-processing is used depending on the decoded signal quality. Therefore, in some embodiments, an overall controlling of the post-processing is introduced by using the controlling parameter: β (0≦β≦1), with β=0 meaning no postprocessing and β=1 meaning full postprocessing. For example, in an embodiment, block 1009 calculates:

$$Gain_2(i) = \beta \cdot Gain_1(i) + (1-\beta), \tag{6}$$

where β (0≦β≦1) is a parameter to control strong post-processing or weak post-processing. In some embodiments, parameter β can be constant, and in some embodiments it can also be real time variable depending on many factors such as transmitted bit rate, CODEC real time quality, speech/music characteristic, and/or noisy/clean signal characteristics.

As an example, the setting of β for ITU-T G.729.1/G.718 super-wideband extension is related to the output of the signal type classifier:

```
if (Category=0) { //speech
β = 0;
}
else if (Category<3) {
   β = 0.5 β0;
}
else if (Category=4) { //music
   β = 1.1 β0;
},
```

where $\beta_0$ is a constant value of about 0.5, and the Category determination algorithm can be found as follows.

A sound signal is separated into categories that provide information on the nature of the sound signal. In one embodiment, a mean of past 40 values of total frame energy variation is found by $$\overline{E}_\Delta = \frac{1}{40} \sum_{i=-40}^{-1} E_\Delta^{[i]},$$

where $$E_\Delta^{[i]} = E_t^{[i]} - E_t^{[i-1]}, \text{ for } i=-40, \ldots, -1.$$

The superscript i denotes a particular past frame. Then, a statistical deviation is calculated between the past 15 values of total energy variation and the 40-value mean:

$$E_{dev} = 0.7745967 \cdot \sqrt{\frac{\sum_{i=-15}^{-1} (E_\Delta^{[i]} - \overline{E}_\Delta)^2}{15}}.$$

In an embodiment, the resulting energy deviation is compared to four thresholds to determine the efficiency of the inter-tone noise reduction for the specific frame. The output of the signal type classifier module is an index corresponding to one of five categories, numbered 0 to 4. The first type (Category 0) corresponds to a non-tonal sound, like speech, which is not affected by the inter-tone noise reduction algorithm. This type of sound signal has generally a large statistical deviation. The three middle categories (1 to 3) include sounds with different types of statistical deviations. The last category (Category 4) includes sounds that exhibit minimal statistical deviation.

In an embodiment, the thresholds are adaptive in order to prevent wrong classification. Typically, a tonal sound like music exhibits a much lower statistical deviation than a non-tonal sound like speech. But even music could contain higher statistical deviation and, similarly, speech could contain lower statistical deviation.

In an embodiment, two counters of consecutive categories are used to increase or decrease the respective thresholds. The first counter is incremented in frames, where Category 3 or 4 is selected. This counter is set to zero, if Category 0 is selected and is left unchanged otherwise. The other counter has an inverse effect. It is incremented if Category 0 is selected, set to zero if Category 3 or 4 is selected and left unchanged otherwise. The initial values for both counters are zero. If the counter for Category 3 or Category 4 reaches the number of 30, all thresholds are increased by 0.15625 to allow more frames to be classified in Category 4. On the other side, if the counter for Category 0 reaches a value of 30, all thresholds are decreased by 0.15625 to allow more frames to be classified in Category 0. In alternative embodiments, more or less categories can be determined, and other threshold counter and determination schemes can be used.

The thresholds are limited by a maximal and minimal value to ensure that the sound type classifier is not locked to a fixed category. The initial, minimal and maximal values of the thresholds are defined as follows:

| | | |
|---|---|---|
| $M^{[0]} = 2.5$, | $M_{min}^{[0]} = 1.875$, | $M_{max}^{[0]} = 3.125$, |
| $M^{[1]} = 1.875$, | $M_{min}^{[1]} = 1.25$, | $M_{max}^{[1]} = 2.8125$, |
| $M^{[2]} = 1.5625$, | $M_{min}^{[2]} = 0.9375$, | $M_{max}^{[2]} = 2.1875$, |
| $M^{[3]} = 1.3125$, | $M_{min}^{[3]} = 0.625$, | $M_{max}^{[3]} = 1.875$, |

where the superscript [j]=0, . . . , 3 denotes the category j. In alternative embodiments, other initial, minimal and maximal threshold values can be used.

The categories are selected based on a comparison between the calculated value of statistical deviation, $E_{dev}$, and the four thresholds. The selection algorithm proceeds as follows:

```
if (E_dev < M[3]) AND (Category_prev ≧ 3)
    select Category 4
else if (E_dev < M[2]) AND (Category_prev ≧ 2)
    select Category 3
else if (E_dev < M[1]) AND (Category_prev ≧ 1)
    select Category 2
else if E_dev < M[0]
    select Category 1
else
    select Category 0.
```

In case of frame erasure, in one embodiment, all thresholds are reset to their minimum values and the output of the classifier is forced to Category 0 for 2 consecutive frames after the erased frame (3 frames including the erased frame).

In some embodiments, β is slightly reduced in the following way:

```
if (Sharpness>0.18 or Voicing>0.8) {
    β⇐0.4 β ;
}
else if (Sharpness>0.17 or Voicing>0.7) {
    β⇐0.5 β ;
}
else if (Sharpness>0.16 or Voicing>0.6) {
    β⇐0.65 β ;
}
```

-continued

```
else if (Sharpness>0.15 or Voicing>0.5) {
    β⇐0.8 β ;
},
```

where Voicing is a smoothed value of the normalized voicing factor from the CELP:

$$\text{Voicing} \Leftarrow 0.5\,\text{Voicing} + 0.5 G_p$$

$$G_p = E_p/(E_p + E_c)$$

$E_p$ is the energy of the adaptive codebook excitation component, and $E_c$ is the energy of the fixed codebook excitation component.

In embodiments, Sharpness is a spectral sharpness parameter defined as the ratio between average magnitude and peak magnitude in a frequency subband. For some embodiments processing typical music signals, if Sharpness and Voicing values are small, a strong postprocessing is needed. In some embodiments, better CELP performance will create a larger voicing value, and, hence, a smaller β value and weaker post-processing. Therefore, when Voicing is close to 1, it could mean that the CELP CODEC works well in some embodiments. When Sharpness is large, the spectrum of the decoded signal could be noise-like.

In some embodiments, additional gain factor processing is performed before the gain factors are multiplied with the frequency coefficients $F_0(i)$. For example, for ITU-T G.729.1/G.718 super-wideband extension, some extra processing of the current controlling parameter is added, such as smoothing the current controlling parameter with the previous controlling parameter: $\bar{\beta} \Leftarrow 0.75\bar{\beta} + 0.25\beta$. Here, the gain factors are adjusted by using a smoothed controlling parameter:

$$\text{Gain}_2(i) = \bar{\beta} \cdot \text{Gain}_1(i) + (1 - \bar{\beta}). \quad (7)$$

The current gain factors are then further smoothed with the previous gain factors:

$$\overline{\text{Gain}}(i) \Leftarrow 0.25\overline{\text{Gain}}(i) + 0.75\text{Gain}_2(i). \quad (8)$$

Finally, the determined modification gains factors are multiplied with the frequency coefficients $F_0(i)$ to get the post-processed frequency coefficients $F_1(i)$ as shown in the blocks 1011 and 1012:

$$F_1(i) = F_0(i) \cdot \overline{\text{Gain}}(i). \quad (9)$$

In some embodiments, inverse transformation block 1013 is optional. In some embodiments, use of block 1013 depends on whether the original decoder already includes an inverse transformation.

In embodiments that use ITU-T G.729.1, a frequency domain post-processing module for the high band from 4000 Hz to 8000 Hz is implemented. In some embodiments of the present invention, however, the post-processing is performed in one step without distinguishing envelope or fine structure. Furthermore, in embodiments, modification gain factors are generated based on sophisticated perceptual masking effects.

Figure 12:
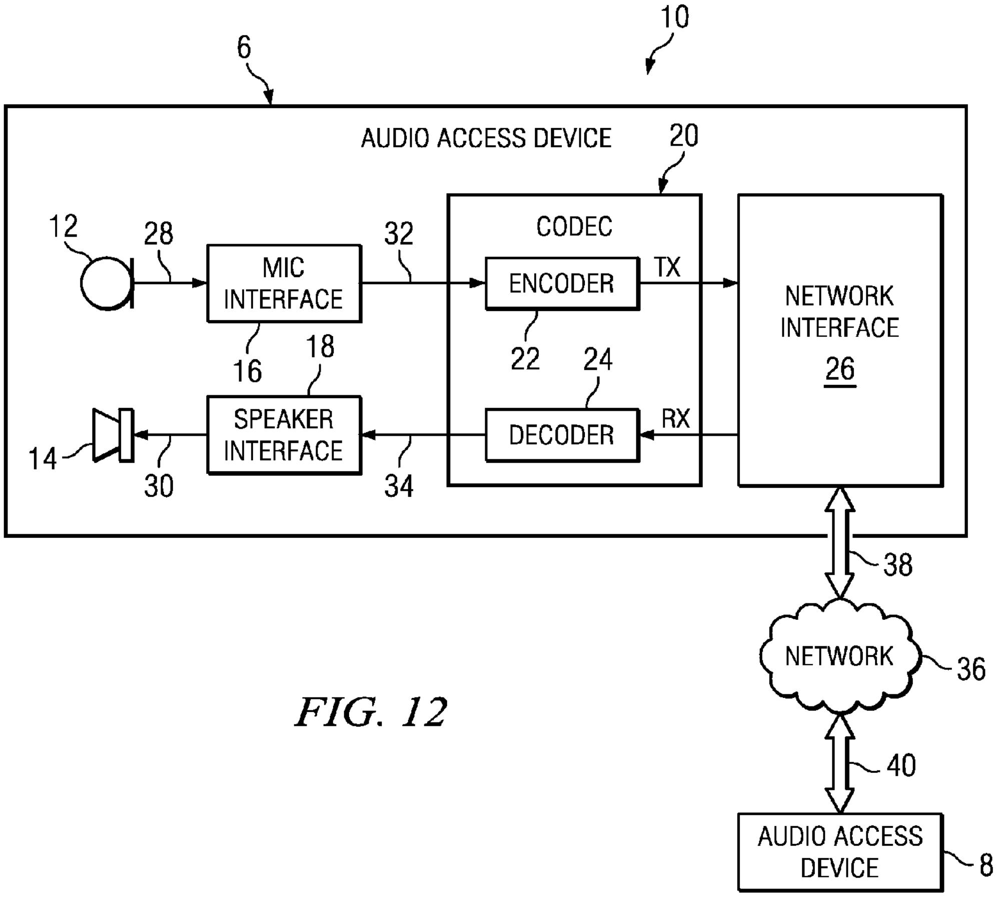
FIG. 12 illustrates an embodiment communication system.

FIG. 12 illustrates communication system 10 according to an embodiment of the present invention. Communication system 10 has audio access devices 6 and 8 coupled to network 36 via communication links 38 and 40. In one embodiment, audio access device 6 and 8 are voice over internet protocol (VOIP) devices and network 36 is a wide area network (WAN), public switched telephone network (PSTN) and/or the internet. Communication links 38 and 40 are wireline and/or wireless broadband connections. In an alternative embodiment, audio access devices 6 and 8 are cellular or mobile telephones, links 38 and 40 are wireless mobile telephone channels and network 36 represents a mobile telephone network.

Audio access device 6 uses microphone 12 to convert sound, such as music or a person's voice into analog audio input signal 28. Microphone interface 16 converts analog audio input signal 28 into digital audio signal 32 for input into encoder 22 of CODEC 20. Encoder 22 produces encoded audio signal TX for transmission to network 36 via network interface 26 according to embodiments of the present invention. Decoder 24 within CODEC 20 receives encoded audio signal RX from network 36 via network interface 26, and converts encoded audio signal RX into digital audio signal 34. Speaker interface 18 converts digital audio signal 34 into audio signal 30 suitable for driving loudspeaker 14.

In an embodiments of the present invention, where audio access device 6 is a VOIP device, some or all of the components within audio access device 6 are implemented within a handset. In some embodiments, however, Microphone 12 and loudspeaker 14 are separate units, and microphone interface 16, speaker interface 18, CODEC 20 and network interface 26 are implemented within a personal computer. CODEC 20 can be implemented in either software running on a computer or a dedicated processor, or by dedicated hardware, for example, on an application specific integrated circuit (ASIC). Microphone interface 16 is implemented by an analog-to-digital (A/D) converter, as well as other interface circuitry located within the handset and/or within the computer. Likewise, speaker interface 18 is implemented by a digital-to-analog converter and other interface circuitry located within the handset and/or within the computer. In further embodiments, audio access device 6 can be implemented and partitioned in other ways known in the art.

In embodiments of the present invention where audio access device 6 is a cellular or mobile telephone, the elements within audio access device 6 are implemented within a cellular handset. CODEC 20 is implemented by software running on a processor within the handset or by dedicated hardware. In further embodiments of the present invention, audio access device may be implemented in other devices such as peer-to-peer wireline and wireless digital communication systems, such as intercoms, and radio handsets. In applications such as consumer audio devices, audio access device may contain a CODEC with only encoder 22 or decoder 24, for example, in a digital microphone system or music playback device. In other embodiments of the present invention, CODEC 20 can be used without microphone 12 and speaker 14, for example, in cellular base stations that access the PTSN. In some embodiments, decoder 24 performs embodiment audio post-processing algorithms.

In an embodiment, a method of frequency domain post-processing includes applying an adaptive modification gain factor to each frequency coefficient, and determining gain factors based on Local Masking Magnitude and Local Masked Magnitude. In a further embodiment, the frequency domain of performing the post-processing is in a MDCT domain or a FFT domain. In some embodiments, post-processing is performed with an audio post-processor.

In some embodiments, Local Masking Magnitude $M_0(i)$ is estimated according to perceptual masking effect. $M_0(i)$ is estimated by taking a weighted sum around the location of the specific frequency at i:

$$M_0(i) = \sum_k w_0^i(k) \cdot |F_0(i+k)|,$$

where the weighting window $w_0^i(k)$ is frequency dependent, and $F_0(i)$ are the frequency coefficients before the post-processing is applied. In some embodiments, $w_0^i(k)$ is asymmetric.

In some embodiments, Local Masked Magnitude $M_1(i)$ is estimated according to perceptual masking effect. $M_1(i)$ can be estimated by taking a weighted sum around the location of the specific frequency at i similar to $M_0(i)$:

$$M_1(i) = \sum_k w_1^i(k) \cdot |F_0(i+k)|,$$

where the weighting window $w_1^i(k)$ is frequency dependent, and $w_1^i(k)$ is flatter and longer than $w_0^i(k)$. In some embodiments, $w_1^i(k)$ is asymmetric.

In an embodiment, a method of frequency domain post-processing includes applying adaptive modification gain factor to each frequency coefficient and determining gain factors based on Local Masking Magnitude, Local Masked Magnitude, and Average Magnitude. In an embodiment, post-processing is performed in a frequency domain comprising MDCT domain or FFT domain.

In an embodiment, Local Masking Magnitude $M_0(i)$ is estimated according to perceptual masking effect. In one example, $M_0(i)$ is estimated by taking a weighted sum around the location of the specific frequency at i:

$$M_0(i) = \sum_k w_0^i(k) \cdot |F_0(i+k)|,$$

where the weighting window $w_0^i(k)$ is frequency dependent, and $F_0(i)$ are the frequency coefficients before the post-processing is applied. In some embodiments, $w_0^i(k)$ is asymmetric.

In a further embodiment, Local Masked Magnitude $M_1(i)$ is estimated according to perceptual masking effect. In an example, Local Masked Magnitude $M_1(i)$ is estimated by taking a weighted sum around the location of the specific frequency at i similar to $M_0(i)$:

$$M_1(i) = \sum_k w_1^i(k) \cdot |F_0(i+k)|,$$

where the weighting window $w_1^i(k)$ is theoretically asymmetric and frequency dependent, and flatter and longer than $w_0^i(k)$. In some embodiments, $w_0^i(k)$ and/or $w_1^i(k)$ are asymmetric.

In an embodiment, Average Magnitude $M_{av}$ is calculated on a whole spectrum band which needs to be post-processed. In one example, the Average Magnitude $M_{av}$ is calculated by $$M_{av} = \sum_i |F_0(i)| / N_F,$$

where $N_F$ is the total number of the frequency coefficients.

In an embodiment, one way to calculate the initial gain factor for each frequency is $$Gain_0(i) = \frac{M_0(i)}{\alpha \cdot M_1(i) + (1-\alpha) \cdot M_{av}},$$

where α (0≦α≦1) is a value close to 1. In some embodiments, α is 15/16. In further embodiments, α a is between 0.9 and 1.0. In a further embodiment, the gain factors can be further normalized to maintain the energy:

$$Gain_1(i) = Gain_0(i) \cdot Norm,$$

where the normalization factor Norm is defined as, $$Norm = \sqrt{\frac{\sum_i |F_0(i)|^2}{\sum_i |Gain_0(i) \cdot F_0(i)|^2}}.$$

In a further embodiment, the normalized gain factors can be controlled by a parameter:

$$Gain_2(i) = \beta \cdot Gain_1(i) + (1-\beta)$$

where β (0≦β≦1) is a parameter to control strong post-processing or weak post-processing. In a further embodiment, this controlling parameter can be replaced by a smoothed one with the previous controlling parameter such as:

$$\bar{\beta} \Leftarrow 0.75\bar{\beta} + 0.25\beta.$$

In a further embodiment, finally determined gain factors are multiplied with the frequency coefficients to get the post-processed frequency coefficients. Further embodiment methods include, for example, receiving the frequency domain audio signal from a mobile telephone network, and converting the post-processed frequency domain signal into a time domain audio signal.

In some embodiments, the method is implemented by a system configured to operate over a voice over internet protocol (VOIP) system or a cellular telephone network. In further embodiments, the system has a receiver that includes an audio decoder configured to receive the audio parameters and produce an output audio signal based on the received audio parameters. Frequency domain post-processing according to embodiments is included in the system.

Although the embodiments and their advantages have been described in detail, it should be understood that various changes, substitutions and alterations can be made herein without departing from the spirit and scope of the invention. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. For example, it is contemplated that the circuitry disclosed herein can be implemented in software, or vice versa.

What is claimed is:

1. A method of post-processing of a frequency domain audio signal implemented by an audio post-processor, the method comprising:

applying adaptive modification gain factor to each frequency coefficient of the frequency domain audio signal by using the audio post-processor; and determining gain factors based on Local Masking Magnitude and Local Masked Magnitude;

wherein the Local Masking Magnitude and Local Masked Magnitude are estimated according to perceptual masking effects, wherein the Local Masking Magnitude is estimated by taking a weighted sum around a specific frequency at i:

$$M_0(i) = \sum_k w_0^i(k) \cdot |F_0(i+k)|,$$

where $M_0$ (i) is the Local Masking Magnitude, $w_0^i$ (k) is a first frequency dependent weighting window, F0(i) are frequency coefficients of the frequency domain audio signal before the post-processing is applied, and k is an index value, wherein Local Masked Magnitude $M_1$ (i) is estimated by taking a weighted sum the specific frequency at i:

$$M_1(i) = \sum_k w_1^i(k) \cdot |F_0(i+k)|,$$

where $M_1$ (i) is the Local Masked Magnitude, $w_1^i$ (k) is a second frequency dependent weighting window, and wherein weighting window $w_1^i$ (k) is flatter and longer in the frequency domain than $w_0^i$ (k), and wherein an initial gain factor for each frequency is $$Gain_0(i) = \frac{M_0(i)}{\alpha \cdot M_1(i) + (1-\alpha) \cdot M_{av}},$$

where i is a frequency index, $M_{av}$ is an Average Magnitude, and 0≦α≦1.

2. The method of claim 1, wherein the audio post-processor performs post-processing in a Modified Discrete Cosine Transform (MDCT) domain or a Fast Fourier Transform (FFT) domain.

3. A method of post-processing of a frequency domain audio signal implemented by using an audio post-processor, the method comprising:

applying adaptive modification gain factor to each frequency coefficient of the frequency domain audio signal by using the audio post-processor; and determining gain factors based on Local Masking Magnitude, Local Masked Magnitude, and Average Magnitude;

wherein the Local Masking Magnitude is estimated by taking a weighted sum around a specific frequency at i:

$$M_0(i) = \sum_k w_0^i(k) \cdot |F_0(i+k)|,$$

where $M_0$ (i) is the Local Masking Magnitude, $w_0^i$ (k) is a first frequency dependent the weighting window, F0(i) are frequency coefficients of the frequency domain audio signal before the post-processing is applied, and k is an index value, wherein Local Masked Magnitude $M_1$ (i) is estimated by taking a weighted sum the specific frequency at i:

$$M_1(i) = \sum_k w_1^i(k) \cdot |F_0(i+k)|,$$

where $M_1$ (i) is the Local Masked Magnitude, $w_1^i$ (k) is a second frequency dependent weighting window, and wherein weighting window $w_1^i$ (k) is flatter and longer in the frequency domain than $w_0^i$ (k), wherein the Average Magnitude is calculated on a whole spectrum band of the frequency domain audio signal, and wherein an initial gain factor for each frequency is $$Gain_0(i) = \frac{M_0(i)}{\alpha \cdot M_1(i) + (1-\alpha) \cdot M_{av}},$$

where i is a frequency index, $M_{av}$ is the Average Magnitude, and $0 \leqq \alpha \leqq 1$.

4. The method of claim 3, wherein the Average Magnitude is calculated by:

$$M_{av} = \sum_k |F_0(k)| / N_F,$$

wherein $M_{av}$ is the Average Magnitude, NF is a total number of the frequency coefficients, and k is an index value.

5. The method of claim 3, wherein:

$$M_{av} = \sum_k |F_0(k)| / N_F; \text{ and}$$

NF is a total number of the frequency coefficients.

6. The method of claim 5, wherein the first frequency dependent weighting window is asymmetric and the second frequency dependent weighting window is asymmetric.

7. The method of claim 5, wherein gain factors are normalized according to:

$$\text{Gain}_1(i) = \text{Gain}_0(i) \cdot \text{Norm},$$

wherein normalization factor Norm is defined as, $$Norm = \sqrt{\frac{\sum_i |F_0(i)|^2}{\sum_i |Gain_0(i) \cdot F_0(i)|^2}}.$$

8. The method of claim 7, wherein the normalized gain factors can be controlled by parameter β such that:

$$\text{Gain}_2(i) = \beta \cdot \text{Gain}_1(i) + (1-\beta)$$

wherein $(0 \leqq \beta \leqq 1)$, β is a parameter that controls strong post-processing or weak post-processing.

9. The method of claim 8, wherein β is replaced by a smoothed controlling parameter $\bar{\beta}$, such that:

$$\bar{\beta} \Leftarrow 0.75\bar{\beta} + 0.25\beta.$$

10. The method of claim 3, wherein determined gain factors are multiplied with the frequency coefficients to produce post-processed frequency coefficients.

11. The method of claim 3, further comprising receiving the frequency domain audio signal from a voice over internet protocol (VOIP) network.

12. The method of claim 3, further comprising receiving the frequency domain audio signal from a mobile telephone network.

13. The method of claim 3, further comprising converting the post-processed frequency domain signal into a time domain audio signal.

14. A system for receiving a frequency domain audio signal, the system comprising a post-processor configured to:

apply an adaptive modification gain factor to each frequency coefficient of the frequency domain audio signal; and determine gain factors based on Local Masking Magnitude and Local Masked Magnitude and Average Magnitude, wherein the post-processor estimates the Local Masking Magnitude by taking a weighted sum around a specific frequency at i:

$$M_0(i) = \sum_k w_0^i(k) \cdot |F_0(i+k)|,$$

where $M_0$ (i) is the Local Masking Magnitude, $w_0^i$ (k) is a first frequency dependent weighting window, F0(i) are frequency coefficients of the frequency domain audio signal before the post-processing is applied, and k is an index value, wherein the post-processor estimates the Local Masked Magnitude $M_1$ (i) by taking a weighted sum the specific frequency at i:

$$M_1(i) = \sum_k w_1^i(k) \cdot |F_0(i+k)|,$$

where $M_1$ (i) is the Local Masked Magnitude, $w_1^i$ (k) is a second frequency dependent weighting window, and wherein weighting window $w_1^i$ (k) is flatter and longer in the frequency domain than $w_0^i$ (k), wherein the post-processor calculates the Average Magnitude on a whole spectrum band of the frequency domain audio signal, and wherein the post-processor calculates an initial gain factor $\text{Gain}_0$ (i) for each frequency according to:

$$\text{Gain}_0(i) = \frac{M_0(i)}{\alpha \cdot M_1(i) + (1-\alpha) \cdot M_{av}},$$

where i is a frequency index, $M_{av}$ (i) is the Average Magnitude, and $0 \leqq \alpha \leqq 1$.

15. The system of claim 14, wherein:

$$M_{av} = \sum_k |F_0(k)| / N_F; \text{ and}$$

NF is a total number of the frequency coefficients.

16. The system of claim 14, wherein the system is configured to operate over a voice over internet protocol (VOW) system or a cellular telephone network.

17. The system of claim 14, further comprising an audio decoder configured to receive audio parameters and produce the audio signal based on the received audio parameters.

18. The system of claim 14, wherein the receiver is further configured to convert an output of the post-processor to an output audio signal.

19. The system of claim 18, wherein the output audio signal is configured to be coupled to a loudspeaker.

* * * * *